United States Patent [19]

Gellerson

[11] Patent Number: 4,655,245
[45] Date of Patent: Apr. 7, 1987

[54] HYDRAULIC FUSE

[75] Inventor: Walter G. Gellerson, Yakima, Wash.

[73] Assignee: Dowty Decoto, Inc., Yakima, Wash.

[21] Appl. No.: 873,962

[22] Filed: Jun. 13, 1986

[51] Int. Cl.⁴ ............................................. F16K 21/16
[52] U.S. Cl. .................................. 137/493; 137/508; 251/16
[58] Field of Search .................. 251/16; 137/462, 493, 137/493.8, 493.9, 508, 538

[56] References Cited

U.S. PATENT DOCUMENTS

| | | | |
|---|---|---|---|
| 2,184,190 | 12/1939 | Krauss | 137/493 X |
| 2,512,190 | 6/1950 | Waterman | 251/16 X |
| 2,592,486 | 4/1952 | Stark | 251/16 |
| 3,092,137 | 6/1963 | Van Eldik Thieme et al. | 137/493 |
| 4,256,137 | 3/1981 | de Lannay | 137/538 X |

FOREIGN PATENT DOCUMENTS 974852  9/1975  Canada .................................. 137/508

Primary Examiner—Martin P. Schwadron
Assistant Examiner—Stephen M. Hepperle
Attorney, Agent, or Firm—William W. Haefliger

[57] ABSTRACT

A hydraulic fuse monitors the quantity of hydraulic fluid passing through the fuse, and then blocks such flow when a selected quantity of fluid has passed through the fuse. It includes:
(a) a body structure containing cavity structure,
(b) a primary piston in the cavity structure and movable endwise to control fluid flow through a first port,
(c) a sleeve, and a sleeve guide in the cavity structure, and in the path of fluid flow toward the primary piston,
(d) the sleeve and guide being relatively axially movable, and there being a spring acting to urge one of the sleeve and guide in one axial direction,
(e) and fluid flow control slots formed by the sleeve and sleeve guide to control flow both to the piston for controllably displacing same, and to the first port, and characterized in that:
 (i) as the forward flow rate through the fuse reaches a threshold the piston begins its movement toward the first port, and
 (ii) as the flow rate increases above the threshold, relative axial movement between the sleeve and guide acts:
  to maintain nearly constant, the fluid pressure drop across a primary slot included with the control slots; and
  to controllably meter fluid flow to the piston via a metering slot included within the control slots, for displacing the first piston as aforesaid,
(f) whereby the piston is displaced to close the first port after a required quantity of fluid has passed through the fuse.

11 Claims, 7 Drawing Figures

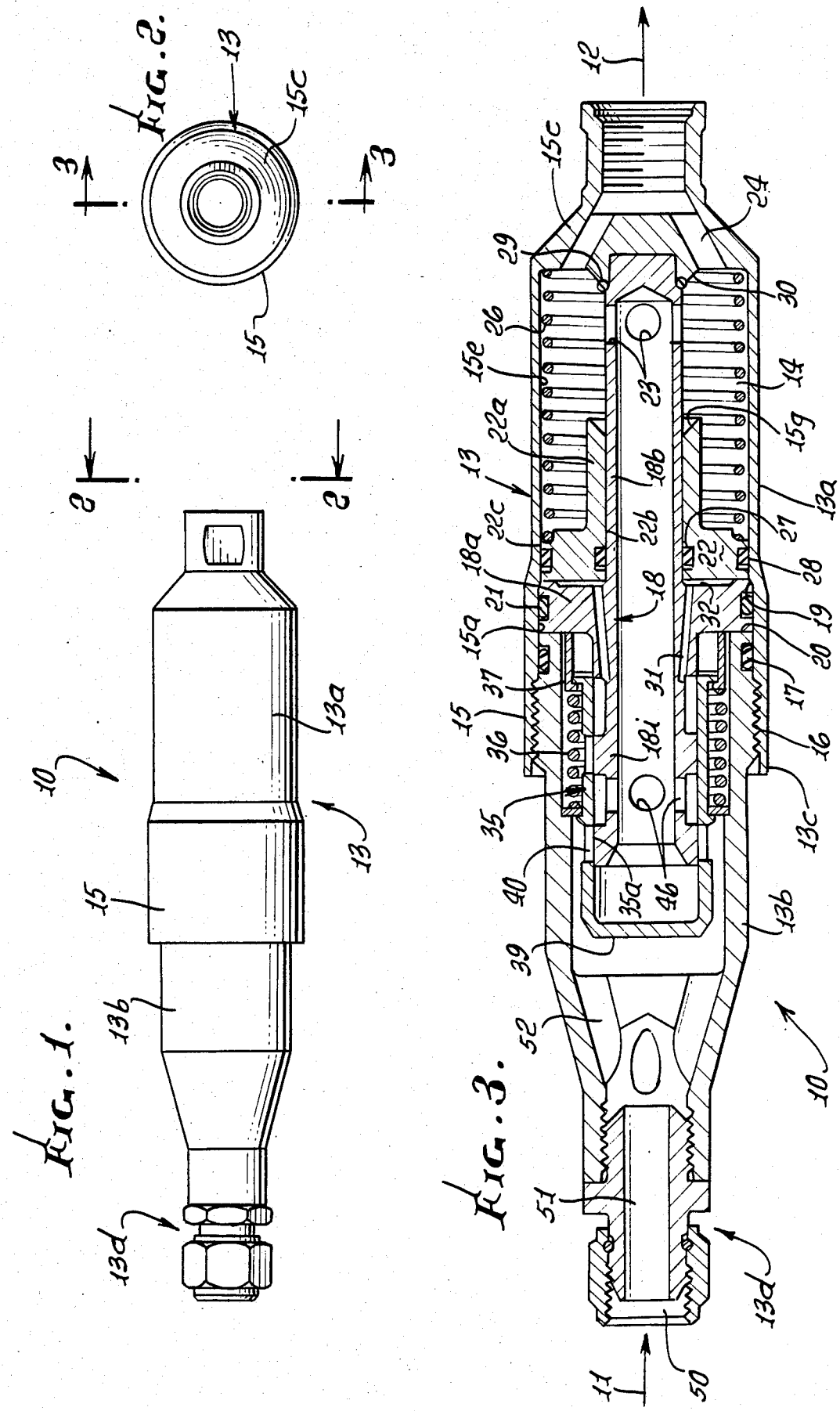

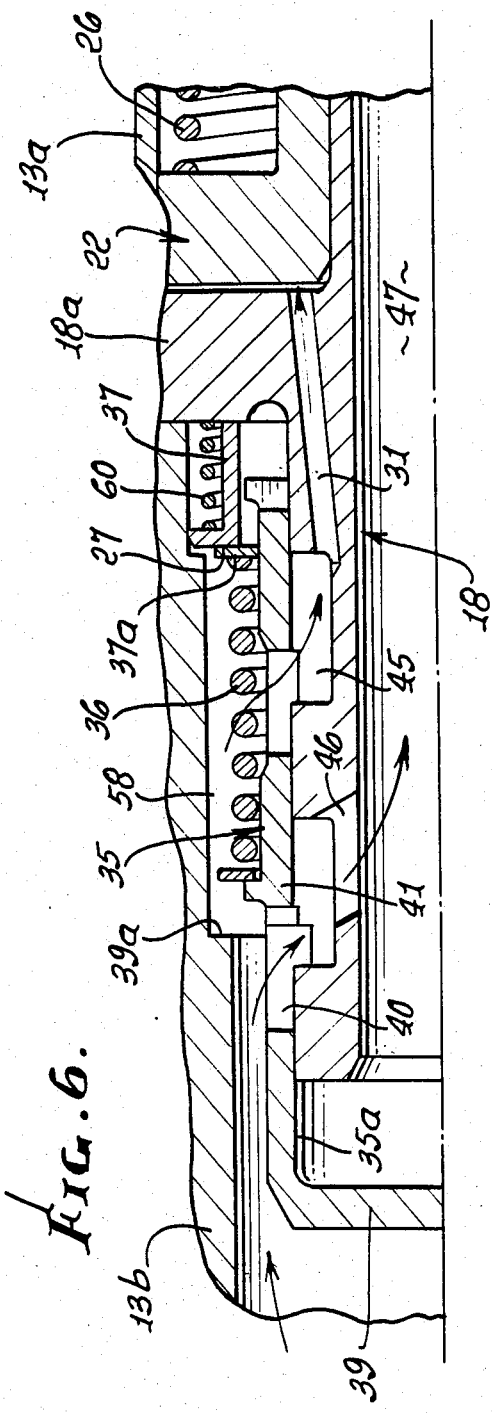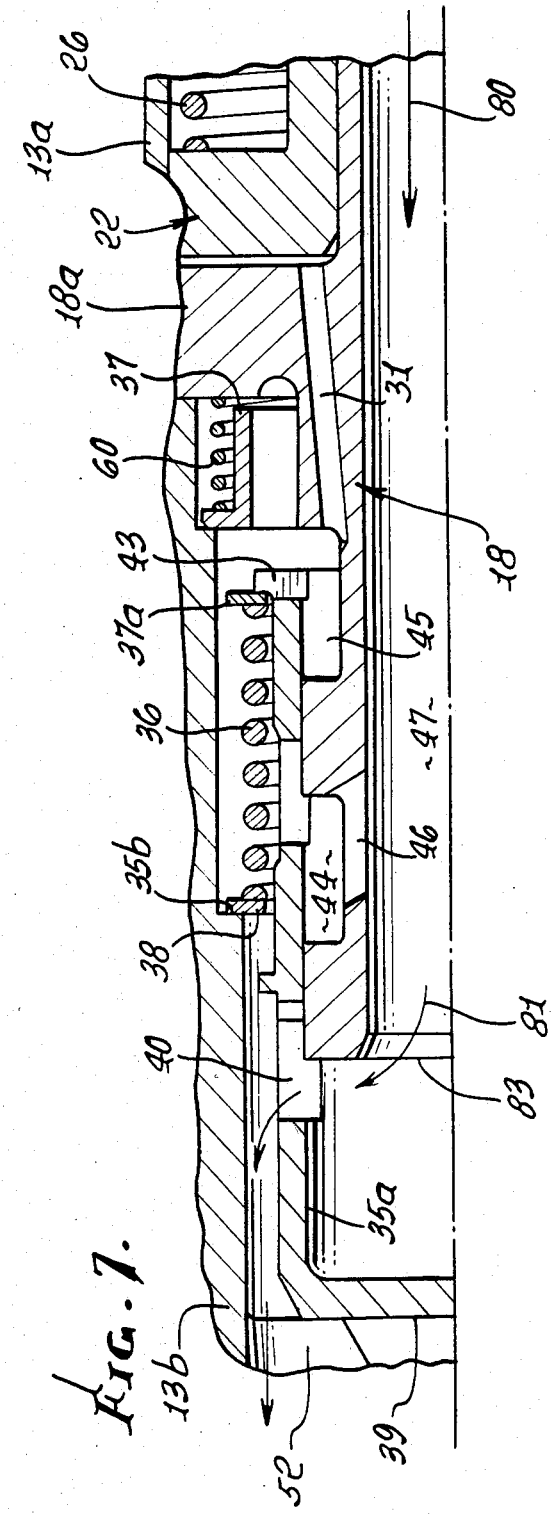

HYDRAULIC FUSE

BACKGROUND OF THE INVENTION

This invention relates generally to an hydraulic "fuse" device; and more particularly it concerns an in-line hydraulic fuse, or sensor, that monitors the quantity of hydraulic fluid that passes through the device, and then blocks the flow when a pre-selected quantity of fluid has passed through.

Devices to accomplish the above functions have employed buoyant pistons and vane motors. Testing of a buoyant piston device showed it to be undesirably and inherently sensitive to changes in attitude of the device; and it was also undesirably critical with respect to fit and clearances. Vane motors, on the other hand, are undesirably expensive. There is need for a simple, effective device having few manufactured parts, relatively high force levels in sensing mechanism, and with flow/volume characteristics which can be readily tailored, i.e. fitted, to many different design requirements.

SUMMARY OF THE INVENTION

It is a major object of the invention to provide an improved device meeting the above needs, as well as providing additional unusual advantages in construction, modes of operation and results.

The device of the invention is characterized as a fuse assembly in the form of an in-line sensor that monitors the quantity of hydraulic fluid passing through, and then blocks the flow when a desired quantity has passed. The fuse typically can be reset by either flowing fluid in the reverse direction, or by lowering the differential pressure across the fuse assembly to a low limit. Also provided is a threshold characteristic that will not allow the fuse to close when the flow rate is less than a pre-set minimum.

Typically, the moving components, i.e. the piston and sleeve, are positioned about a single element, the sleeve guide, and the majority of the static components are also located by the sleeve guide. The combination of sleeve, sleeve guide and sleeve spring are used to translate fluid flow through the fuse into a proportional, smaller flow that is used to detect the total volume of fluid that has passed through the fuse. In this regard, the sleeve has multiple primary flow slots, a small slot for setting the threshold, a metering slot, and reset slots for resetting the fuse. Fluid flow through the primary slots creates a nearly constant differential pressure across the fuse through the combination of the sleeve area and the sleeve spring force. The small threshold slot is used to set the upper and lower threshold limits; the metering slot meters flow into the piston cavity and thereby shuts off the flow through the fuse; and the reset slots allow fluid to escape from the piston cavity when the sleeve is in the no-flow position.

Basically, then, the hydraulic fuse of the invention comprises, in combination:

(a) a body structure containing cavity structure,
(b) a primary portion in the cavity structure and movable endwise to control fluid flow through a first port,
(c) a sleeve, and a sleeve guide in the cavity structure, and in the path of fluid flow toward the primary piston,
(d) the sleeve and guide being relatively axially movable, and there being a spring acting to urge one of the sleeve and guide in one axial direction,
(e) and fluid flow control slots formed by the sleeve and sleeve guide to control flow both to said piston for controllably displacing same, and to said first port, and characterized in that:
  (i) as the forward flow rate through the fuse reaches a threshold the piston begins its movement toward said first port, and
  (ii) as the flow rate increases above the threshold, relative axial movement between the sleeve and guide acts:
    to maintain nearly constant, the fluid pressure drop across primary slot means included with in said control slots; and
    to controllably meter fluid flow to the piston via metering slot means included within said control slots, for displacing said first piston as aforesaid,
(f) whereby the piston is displaced to close the first port after a required quantity of fluid has passed through the fuse.

These and other objects and advantages of the invention, as well as the details of an illustrative embodiment, will be more fully understood from the following specification and drawings, in which:

DRAWING DESCRIPTION

FIG. 1 is an external, side elevation, showing an hydraulic fuse embodying the invention;

FIG. 2 is an end view taken on lines 2—2 of FIG. 1;

FIG. 3 is a section taken in elevation through the FIGS. 1 and 2 fuse assembly, and on lines 3—3 of FIG. 2; and FIGS. 4-7 are fragmentary sections, taken in elevation, showing the positions of fuse elements in zero flow condition (FIG. 4); threshold flow condition (FIG. 5); full flow condition (FIG. 6); and reverse flow condition (FIG. 7).

DETAILED DESCRIPTION

Figure 4:
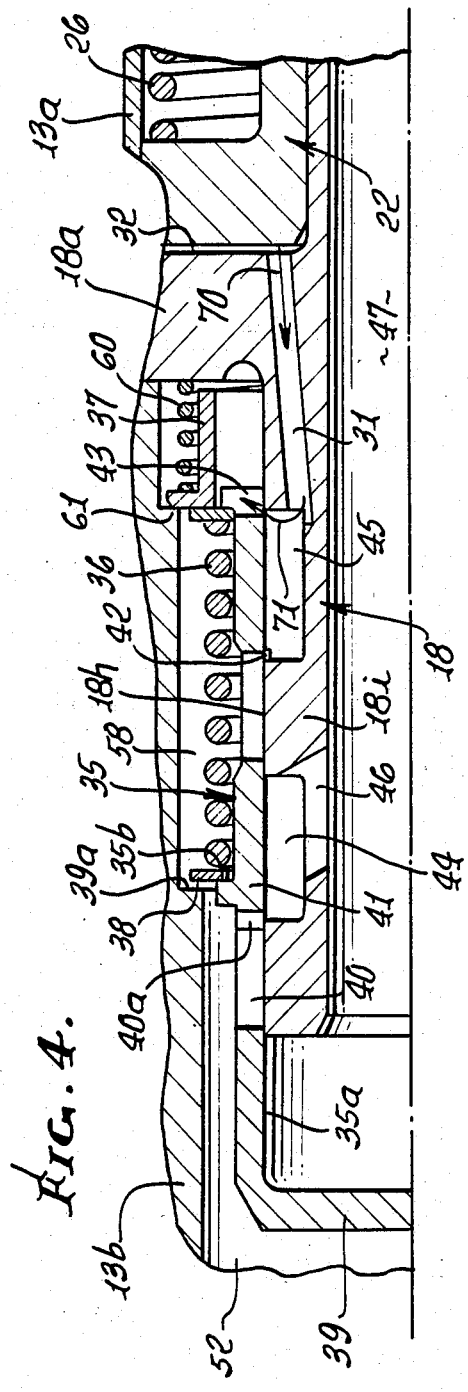

The illustrated hydraulic fuse 10 is adapted to monitor the quantity of hydraulic fluid passing through it, for example in direction of arrows 11 and 12, and then block such flow when a selected quantity of fluid has passed through the device.

The fuse includes body structure 13 containing cavity structure 14. The body structure may advantageously comprise a forward cylinder 13a, a rearward plug 13b, and a rearwardmost fitting assembly 13d. The cylinder has an enlarged rearward section 15 telescopically receiving the plug 13b, with threads interconnecting these elements at 16. An O-ring seal 17 also seals off therebetween.

A sleeve guide 18 extends in the body cylinder, i.e. within cavity structure 14, and has a flange 18a that fits the bore 15a of section 13c. It is held in axial position, against cylinder internal tapered shoulder 19, by the forward end 20 of the plug 13b. An O-ring seal or packing 21 seals off between the flange outer surface and the bore 15a.

A primary piston 22 is located in the cavity structure within the cylinder, to move endwise for controlling fluid flow through first and second ports 23 and 24. As shown, the piston 22 is annular and is slidable along the tubular stem 18b of the guide 18. As the piston moves rightwardly, its tubular stem 22a closes four ports 23 in stem 18b, to block forward flow of fluid via such ports and to exit points 24 in the cylinder forwardly tapered end piece 15c. A compression spring 26 in cavity 14 yieldably resists forward movement of the piston, as described. Seals 27 and 28 respectively seal off between the piston bore 22b and the guide stem 18b, and between the piston outer surface 22c and the bore 15e of cylinder section 13a. The tapered forward end 15g of the piston stem first seats against O-ring seal 29 and then against cylinder body taper 30, in extreme rightward position of the piston. Hydraulic fluid pressure to displace the piston rightwardly passes via slot means (to be described) and ports 31 in the guide 18 to the chamber 32 adjacent the left end face of the piston.

Also provided in the body cavity structure is a tubular control sleeve 35, which is axially movable along and upon the guide 18. As shown, the sleeve has a bore 35a slidably closely fitting on the outer cylindrical surface 18h of the guide stem 18i, projecting leftwardly from flanged portion 18a of the guide. As shown, the sleeve 35 and guide 18 are in the path of fluid flow toward the primary piston, and they are relatively axially movable, as referred to. A compression spring 36 acts to urge the sleeve in an axial direction, i.e. to the left, in the example. The spring is in a permanent state of compression between a tubular seat 37, and an annular retainer 38. The latter initially engages a plug shoulder 39a to limit spring extension, but when sufficient force build-up occurs, the retainer 38 is displaced rightwardly by the sleeve shoulder 35b. The sleeve includes a cap 39 that fits over the left end of the guide 18, and forms therewith a primary flow slot 40.

In accordance with an important aspect of the invention, fluid flow control slots are formed by the relatively movable sleeve and guide to control flow both to the piston for controllably displacing same, and to the first port 23, and also port 24, and characterized in that:
(i) as the forward flow rate through the fuse reaches a threshold, the piston begins said movement toward said first port, and
(ii) as the flow rate increases above said threshold, relative axial movement between the sleeve and guide acts:
to maintain nearly constant, the fluid pressure drop across primary slot means included with in said control slots; and
to controllably meter fluid flow to the piston via metering slot means included within said control slots, for displacing said first piston as aforesaid, In these regards, and extending the description to FIGS. 4–7, the fluid flow control slots include, for example, the primary flow slot or slots 40, a small threshold slot 40a at the forward end of slots 40 (these slots extending radially through the sleeve wall 41); a metering slot 42 through wall 41, spaced forwardly of slot 40a; and a reset slot or slots 43 through wall 41, at the forward end of the sleeve. Note also the recesses or grooves 44 and 45 sunk in the wall of stem 18i, the recess 44 opening at 46 to the interior 47 of the guide in communication with port 23. Four primary slots 40 are typically provided, about the sleeve axis.

Figure 5:
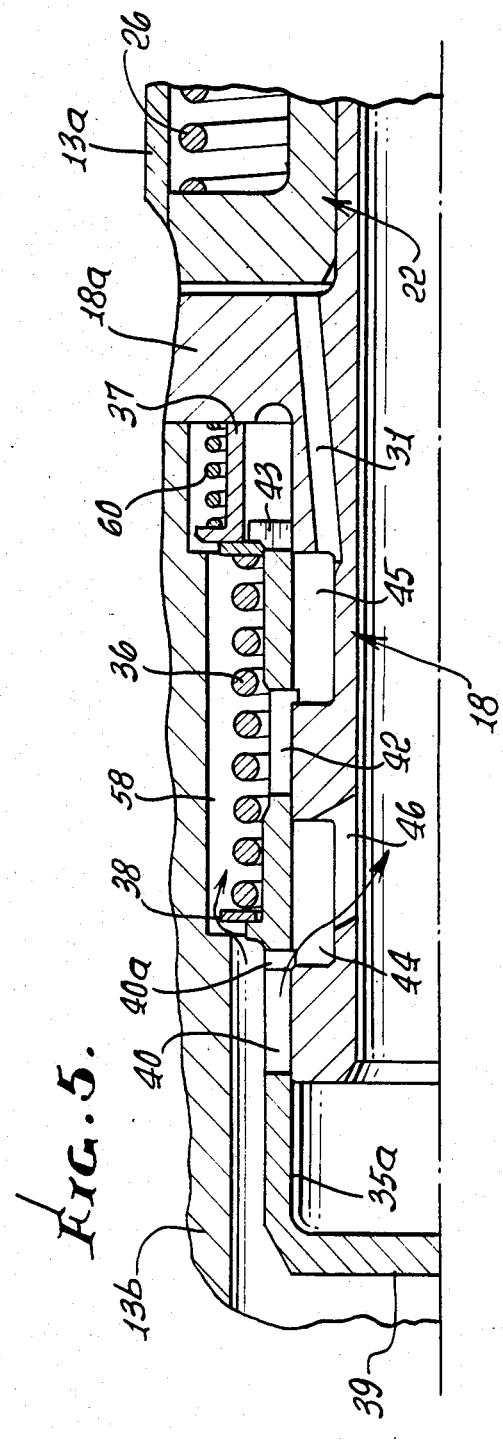

As fluid enters the fuse, via ports 50 and 51 in fittings 13d, it passes to the interior 52 of the plug, externally of the cap 39. Under essentially no-flow condition, as represented in FIG. 4, no fluid flows to the ports 23 and 24 via the primary slot 40 since the sleeve is positioned as shown, whereby the slot 40 is blanked by the exterior surface of the guide. The threshold slot 40a sets upper and lower threshold flow limits, such that when fluid pressure in 52 reaches an upper limit, the sleeve moves slightly to the right to a threshold flow condition, as seen in FIG. 5, and characterized in that fluid now flows through slot 40 to port 23, via 46 and 47, and fluid also flows past the retainer 38 into cavity or space 58 exposed to metering slot 42. Thus, fluid flow is metered via slot 42 to groove 45 and via passage 31 to the piston, initiating its rightward movement. Such flows to 47 and to the piston are increased under full flow condition as represented in FIG. 6; and when the predetermined quantity of fluid has passed through the fuse, (determined by the amount of metered fluid needed to drive piston 22 fully to the right), the outlet ports 23 and 24 are closed. Fluid flow through the primary slots creates a nearly constant differential pressure across the fuse through the combination of the sleeve area and the sleeve spring force.

Since the pressure drop across the sleeve will never exceed 50 psi, for example, even at extreme flow rate, the diametral clearance between the sleeve and sleeve guide can be quite large. In one proposed design, this clearance will be 0.0001/0.0005 inches, which allows the components to be interchangeable with no matched sets.

Under no-flow conditions as seen in FIG. 4, the reset slots 43 allow fluid to escape from the piston chamber (at the left of the piston face) as indicated by arrows 70 and 71. At that time, spring 26 urges the piston to the left.

The fuse construction also allows for reverse flow, as represented by arrows 80 and 81 in FIG. 7. Under such conditions, the fluid pressure against the cap 39 displaces the sleeve leftwardly so that fluid by-passes grooves 44 and 45, exits the left end 83 of the guide 18, and escapes the sleeve via slots 40. Spring 36 yieldably resists leftward displacement of the sleeve, by virtue of seating of retainer 38 at 35b, and leftward compression of the spring by retainer 37a. In FIG. 6, retainer 37a seats at 27, and allows the sleeve to move to the right relative thereof, as shown. Such yieldably resisted movements of the sleeve are facilitated by "lost motion" couplings to the spring 36 as described. A spring 60 urges seat 37 leftwardly against body cylinder shoulder 61, in FIG. 4.

I claim:
1. In an hydraulic fuse to monitor the quantity of hydraulic fluid passing through the fuse, and then block such flow when a selected quantity of fluid has passed through the fuse, the combination comprising
(a) a body structure containing cavity structure,
(b) a primary piston in the cavity structure and movable endwise to control fluid flow through a first port,
(c) a sleeve, and a sleeve guide in the cavity structure, and in the path of fluid flow toward the primary piston,
(d) the sleeve and guide being relatively axially movable, and there being a spring acting to urge one of the sleeve and guide in one axial direction,
(e) and fluid flow control slots formed by the sleeve and sleeve guide to control flow both to said piston for controllably displacing same, and to said first port, and characterized in that:
(i) as the forward flow rate through the fuse reaches a threshold the piston begins said movement toward said first port, and
(ii) as the flow rate increases above said threshold, relative axial movement between the sleeve and guide acts:

to maintain nearly constant, the fluid pressure drop across primary slot means included with said control slots; and to controllably meter fluid flow to the piston via metering slot means included within said control slots, for displacing said first piston as aforesaid, (f) whereby the piston is displaced to close said first port after a required quantity of fluid has passed through the fuse.

2. The combination of claim 1 wherein the sleeve is guided on, and is axially movable relative to, the guide sleeve.

3. The combination of claim 2 wherein the spring urges the sleeve in a direction acting to reduce fluid flow through said primary slot means located in the sleeve and guide.

4. The combination of claim 3 wherein the sleeve guide is hollow to pass flow via said primary slot means from the sleeve exterior to the guide interior, and then toward said first port.

5. The combination of claim 1 wherein said metering slot means communicates with an annular cavity within which the sleeve is axially movable.

6. The combination of claim 1 wherein said control slots include primary slot means extending radially through the sleeve to pass the flow to said first port in full flow axial position of the sleeve.

7. The combination of claim 6 wherein said control slots also include threshold slot means associated with said primary slot means to initiate flow through the sleeve to said first port when the sleeve is in, or approximately in, no flow position.

8. The combination of claim 7 wherein said control slots include metering slot means in the sleeve and axially spaced from the primary slot means to meter said flow to the piston.

9. The combination of claim 8 wherein said control slots include reset slot means at the end of the sleeve to allow escape of fluid from the piston under conditions of no-flow forwardly to said primary port.

10. The combination of claim 1 wherein the sleeve has axially opposite lost motion couplings to the spring, whereby the sleeve may be oppositely displaced by fluid flow pressures in opposite directions corresponding to full flow forwardly through the fuse, and reverse flow through the fuse.

11. The combination of claim 9 wherein the sleeve has a reverse flow position in which the sleeve is displaced endwise oppositely relative to the guide by reverse flow pressure, the spring acting to yieldably limit the extent of said endwise opposite sleeve displacement so that the reverse flow passes through the guide to exit the sleeve via primary slot means included within said control slots.

* * * * *